US010863718B1

(12) United States Patent
Lazarevic

(10) Patent No.: US 10,863,718 B1
(45) Date of Patent: Dec. 15, 2020

(54) SYSTEM FOR DESIGNATING A BOUNDARY OR AREA FOR A PET TECHNICAL FIELD

(71) Applicant: Aleksandar Lazarevic, Lisle, IL (US)

(72) Inventor: Aleksandar Lazarevic, Lisle, IL (US)

( * ) Notice: Subject to any disclaimer, the term of this patent is extended or adjusted under 35 U.S.C. 154(b) by 0 days.

(21) Appl. No.: 16/460,213

(22) Filed: Jul. 2, 2019

(51) Int. Cl.
*A01K 15/02* (2006.01)
*A01K 27/00* (2006.01)
*H04W 4/33* (2018.01)
*G01S 13/88* (2006.01)
*H04W 4/021* (2018.01)

(52) U.S. Cl.
CPC .......... *A01K 15/023* (2013.01); *A01K 27/001* (2013.01); *A01K 27/009* (2013.01); *G01S 13/882* (2013.01); *H04W 4/021* (2013.01); *H04W 4/33* (2018.02)

(58) Field of Classification Search
None
See application file for complete search history.

(56) References Cited

U.S. PATENT DOCUMENTS

| | | | | |
|---|---|---|---|---|
| 6,067,852 A * | 5/2000 | Alber | ...................... | G01S 19/41 73/178 R |
| 9,538,329 B1 * | 1/2017 | Vivathana | ............. | H04W 4/021 |
| 9,648,849 B1 * | 5/2017 | Vivathana | ............ | A01K 27/001 |
| 9,654,925 B1 * | 5/2017 | Solinsky | ............ | G08B 21/0261 |
| 9,848,295 B1 * | 12/2017 | Mason | .................. | H04W 4/025 |
| 10,460,584 B1 * | 10/2019 | Lange | ................ | G08B 21/0266 |
| 10,514,439 B2 * | 12/2019 | Seltzer | ................ | A01K 15/023 |
| 2010/0131192 A1 * | 5/2010 | Clark | ..................... | G01C 21/20 701/532 |
| 2011/0140967 A1 * | 6/2011 | Lopez Pou | .......... | A01K 15/021 342/450 |
| 2014/0206307 A1 * | 7/2014 | Maurer | .................. | H04W 4/90 455/404.2 |
| 2017/0372580 A1 * | 12/2017 | Vivathana | ............... | G01S 19/42 |
| 2018/0239982 A1 * | 8/2018 | Rutschman | ........ | H04N 5/23299 |
| 2019/0208363 A1 * | 7/2019 | Shapiro | .................. | G16H 50/30 |
| 2019/0213860 A1 * | 7/2019 | Shaprio | ................... | H02J 7/025 |
| 2019/0277947 A1 * | 9/2019 | Abe | ....................... | G01S 7/4802 |
| 2019/0369576 A1 * | 12/2019 | Elrod | ................... | A01M 31/00 |

* cited by examiner

*Primary Examiner* — Fekadeselassie Girma
(74) *Attorney, Agent, or Firm* — Lathrop GPM, LLP

(57) ABSTRACT

An apparatus, system, and method for designating a boundary for a pet is usable both outdoors and indoors. A collar device communicates with satellites or indoor location devices to define a boundary for containment of an animal or pet. The device also includes an altimeter for detecting an altitude of the pet, for example, when a pet may jump up onto a table, counter or bed, or when a pet may travel to a different floor of a home, building or other structure.

17 Claims, 3 Drawing Sheets

SYSTEM FOR DESIGNATING A BOUNDARY OR AREA FOR A PET TECHNICAL FIELD

TECHNICAL FIELD

The present invention relates to pet containment systems and in particular, to a system and method of designating boundaries for a pet inside and outside a building.

BACKGROUND OF THE INVENTION

Pet containment systems typically include a device worn by a pet on a collar that interacts wirelessly with a boundary-indicating device to provide an auditory and/or physical signal to the pet before the boundary is crossed. The boundary-indicating device may be a wire that is buried around the perimeter of a property. It may also be an antenna that sends signals to the device on the pet.

Systems that use a boundary-indicating device such as a buried wire may be expensive to install and cause unwanted disruption to the landscape. Once a pet has crossed the wire, there is no further boundary on the pet's movement and further, there is a disincentive for the pet to return to the property due to an additional physical signal when approaching the boundary. Antenna-based systems have similar drawbacks.

Pet collars with a radionavigation-satellite service (RNSS) sensor are also known, for example a Global Positioning System® (GPS) sensor. These collars do not require expensive installation costs, and provide a tracking feature even if a pet has strayed outside a boundary. RNSS sensors are most accurate when they have a line of sight to three different satellites which means they are often most effective out-of-doors.

None of these systems are reliably usable indoors, or provide an indication of a height of the pet, for example, when a pet may jump up onto a table, counter or bed, or when a pet may travel to a different floor of a home, building or other structure. Accordingly, there is a need for an improved a pet containment system that is operable both in- and out-of-doors, that provides additional control of a pet's behavior.

SUMMARY OF THE INVENTION

It is therefore a principle object, feature, aspect, or advantage of the present invention to provide an apparatus, a system, and method which improves over or solves problems and deficiencies in the state-of-the-art. Further objects, features, aspects, and advantages of the invention include apparatus, systems, or methods which encompass an animal feedback apparatus including a housing in which a processor, a memory, a radionavigation-satellite service (RNSS) sensor, an altimeter, a wireless communication device and a power source are at least partially disposed; a connector coupled to the housing, the connector configured to selectively attach to an animal; a feedback emitter in communication with the processor; wherein, the feedback emitter outputs a first feedback signal in response to a command from the processor if the RNSS sensor determines that a current position of the animal is near a set of coordinates stored in the memory; and wherein the feedback emitter outputs a second feedback signal in response to a command from the processor if the altimeter determines that a current position of the animal is near an elevation stored in the memory.

In a further embodiment, a method of delivering corrective feedback to an animal, includes providing a housing in which a processor, a memory, a radionavigation-satellite service (RNSS) sensor, an altimeter, a wireless communication device and a power source are at least partially disposed; providing a connector coupled to the housing, the connector configured to selectively attach to the animal; providing a feedback emitter in communication with the processor; sensing, with the RNSS sensor that a current position of the animal is near a set of coordinates stored in the memory and outputting a feedback signal with the feedback emitter; and sensing, with the altimeter that a current position of the animal is above a certain elevation and outputting a feedback signal with the feedback emitter.

In another embodiment, an animal feedback system includes a feedback device including a housing in which a processor, a memory, radionavigation-satellite service (RNSS) sensor, an altimeter, a wireless communication device and a power source are at least partially disposed; a connector coupled to the housing, the connector configured to selectively attach to an animal; and a feedback emitter in communication with the processor. The system further includes a plurality of indoor location devices further comprising a radio transmitter in communication with the wireless antenna; wherein, the feedback emitter outputs a feedback signal in response to a command from the processor if the processor determines that a current position of the animal relative to the indoor location device is near a set of coordinates stored in the memory; and wherein the feedback emitter outputs a feedback signal in response to a command from the processor if the altimeter determines that a current position of the animal is near an elevation stored in the memory.

In any of the above embodiments, the connector includes a collar configured to be removably secured around the animal's neck.

In any of the above embodiments, the feedback emitter includes at least one electrical probe coupled to the connector and in contact with the animal.

In any of the above embodiments, the feedback signal includes at least one of an electric shock or an audible signal.

In any embodiment, the apparatus, method or system encompasses an accelerometer. Further, the apparatus, method or system encompasses a gyroscope.

In further embodiments, the set of coordinates defines a geofence and further wherein geofence is defined on a remote computing device and transferred to the memory by the wireless communication device.

In any embodiment, the remote computing device accesses and utilizes internet mapping information in defining the predefined allowed area.

In any embodiment, the housing further comprises an input device operably coupled to the processor and the geofence is defined in cooperation with this input device.

In any embodiment, the set of coordinates is defined by positioning the apparatus in a plurality of positions along a boundary of a predefined allowed area; and for each of the plurality of positions, sensing via the RNSS sensor the coordinates of such position and storing such position in the memory.

In any embodiment, the predefined allowed area is three dimensional.

DETAILED DESCRIPTION OF EXEMPLARY EMBODIMENTS

Figure 1:
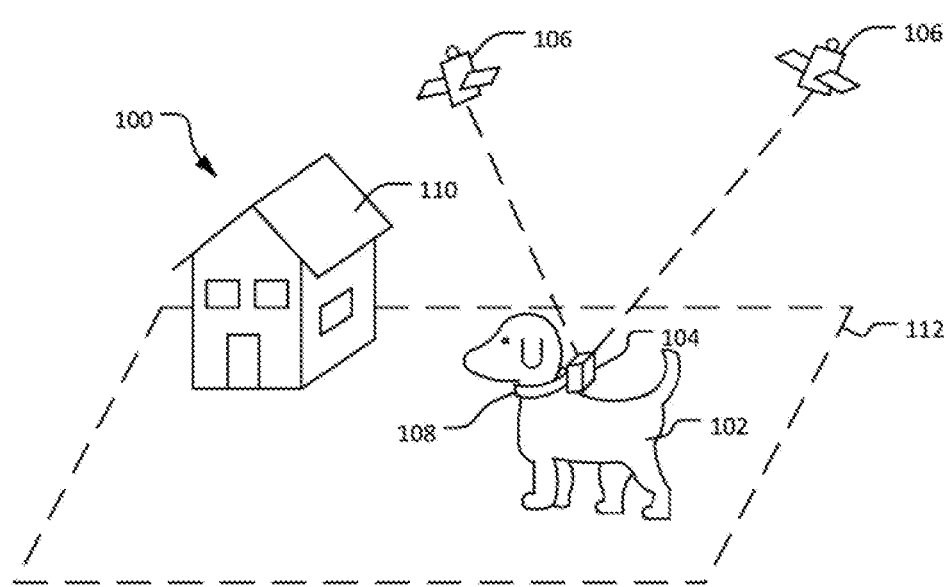
FIG. 1 shows a pet containment system for use outside according to one exemplary embodiment of the invention.

Referring to FIG. 1 an embodiment of an animal containment system 100 is shown. An animal 102 wears an animal feedback device 104 which interacts with one or more satellites 106 so as to determine a real-time position of animal 102. Device 104 is attached to animal 102 by attachment device 108. As shown in FIG. 1, attachment device 108 is a collar. In alternative embodiments, attachment device 108 may be a tag, a harness, clothing or any other device which may be securely and/or removably attached to an animal. Further, although animal 102 is shown as a dog, embodiments are not limited to a specific species of animal or specific breeds within such species, and therefore may be used on cats, horses, etc.

Structure 110 is located within perimeter 112. Although FIG. 1 shows a residential structure 110 with a generally rectangular yard 112, one of ordinary skill in the art would understand that any type of structure or any shape of perimeter, or geofence 112, may be used. Structure 110 may be, for example, a residence (including houses, apartments, condominiums, townhouses, duplexes, etc.) or a commercial building (including retail stores, warehouses, offices, operational facilities, government facilities, service locations, etc.)

In an embodiment, animal feedback device 104 provides auditory and physical feedback to animal 102 when the animal is within a certain proximity of geofence 112. By connecting to a satellite via an RNSS signal, a user can use a computing device such as a mobile device to program boundaries of exactly where an animal may and may not go at any given time, so as to define permissible and impermissible zones. This creates a virtual electric fence, or geofence 112. Although a mobile phone is described, in an alternative, any device capable of mapping or identifying satellite-based coordinates may be used.

Figure 2:
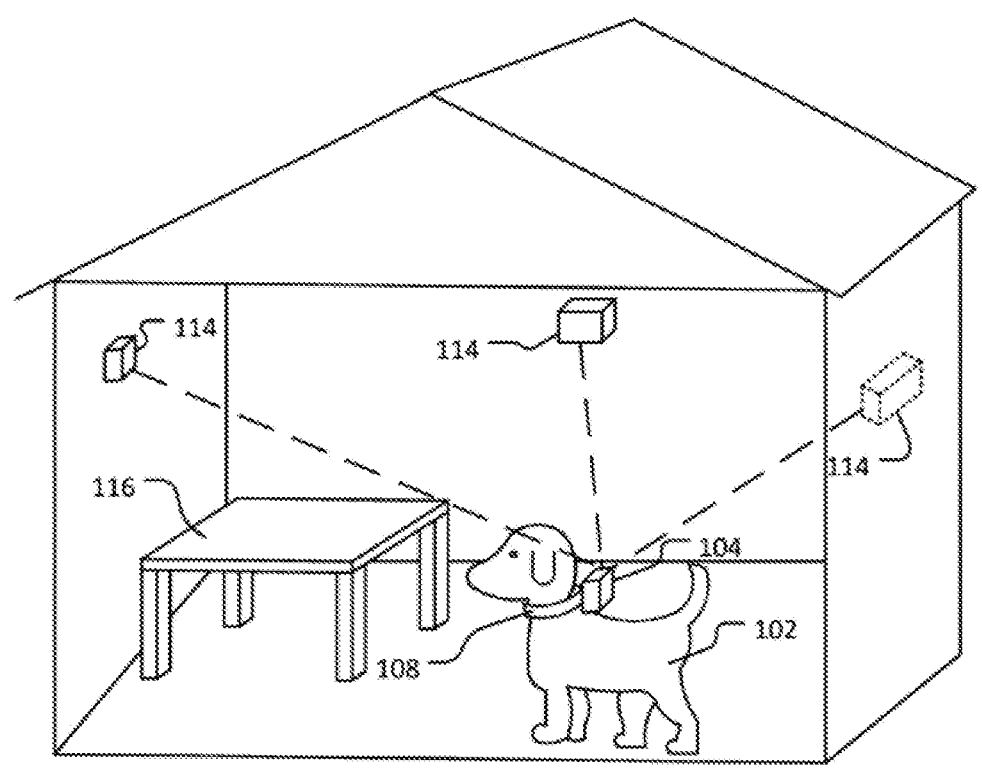
FIG. 2 shows a pet containment system for use inside a structure according to one exemplary embodiment of the invention.

FIG. 2 shows an embodiment of an animal containment system used inside structure 110. Common reference numbers between FIGS. 1 and 2 indicate common elements. Structure 110 is for purposes of illustration only and any type of partially or completely enclosed structure may be used. Feedback device 104 is attached to animal 102 by attachment device 108. In FIG. 2, feedback device 104 communicates with a plurality of indoor location devices 114 to determine location within structure 110. Feedback device 104 also includes an altimeter for sensing changes in height or elevation of animal 102. A height may be programmed into feedback device 104 so that animal 102 receives a negative feedback signal when jumping on top of table 116, for example, or moving to a different level or floor inside a structure.

In an embodiment, a user connects feedback device 104 to an application, or app, on a computing device. The user may optionally calibrate feedback device 104 by encouraging an animal wearing feedback device 104 to move at different speeds for certain amounts of time in a straight line, and allowing feedback device 104 to sync with satellites and RNSS systems, either through the mobile device or feedback device 104 itself.

Once feedback device 104 is connected and calibrated, the user sets up boundaries indoors and outdoors. This may be done in at several ways. To set up a boundary outdoors, the user may open a section of the app that is connected to mapping software and then trace a closed area within which they want their pet to stay. A boundary, or geofence 112, does not have to have a regular shape. An area where a pet is allowed may also enclose subareas where a pet is not allowed, for example, a flower bed.

In an embodiment, everything inside an enclosed area is considered "accessible" and everything outside the area is considered "inaccessible" by feedback device 104. If a pet enters an "inaccessible" area, feedback in the form of a shock will be administered automatically by the collar until the pet leaves the "inaccessible" area. Other feedback mechanism such as a sound may be used instead of or in addition to a shock. One or more alerts may be sent to the user's phone to provide indications indicating that the pet crossed outside of the accessible boundary or has returned inside of the accessible boundary.

In an embodiment, a user may set a boundary inside a structure in addition to or instead of outside the structure. In this method, the user may physically bring feedback device 104 to positions in the room and press a button on the app that registers that specific coordinate. Once a closed area is determined by establishing coordinates to form a shape, for example, the four corners of a room, the inside of a closed area indoors may be defined as either "inaccessible" or "accessible" to an animal wearing collar 108. Accessible areas will have no feedback-device-to-pet feedback and "inaccessible" areas will give feedback-device-to-pet feedback except for a grey-area boundary between the accessible and inaccessible areas that varies upon the pet's movement speed.

Once a boundary is set through the app, a processing device in feedback device 104 remembers this and administers a beep, unheard by humans, when the pet is within two feet of a boundary. The beep progressively gets louder with each 3 inches that the pet gets closer to the boundary line. If the collar crosses the line, it shocks the pet at and beyond the boundary. If the pet is traveling at a speed greater than a walk, as determined during calibration of the collar as described above, the collar will calculate a predetermined expansion of the grey-area boundary to account for the pet's ability to slow down in time so as to not cross the boundary. Thus, in cases when the pet's speed is greater, the grey-area may be increased in size, so as to being providing feedback to the pet earlier, i.e., at a greater distance from the boundary. Similarly, in cases when the pet's speed is relatively slower, the grey-area may be decreased in size, so as to delay providing feedback to the pet, i.e., at a smaller distance from the boundary. The increase of the loudness and frequency of the beeps alerting the pet will be spaced at a distance larger than 3 inches depending once again on the pet's speed, and will be linked to the predetermined expansion of the grey-area boundary increase.

In an alternative embodiment, feedback device 104 may be used in a mobile fashion, such as a virtual leash. This setting will allow the owner to create a 2 or 3-D boundary, depending on preference, for their pet. By setting a radius of travel in feedback device 104, the owner will dictate the pet's ability to move in this predetermined area by way of distance from their phone, or a beacon capable of communicating with feedback device 104. Depending on where the phone or beacon travels, the allowed pet travel radius will change accordingly to the preset travel parameters from the phone or beacon. An infraction of the virtual leash travel line will result in the same response as an infraction of the virtual geofence travel line. In certain embodiments, a beacon, or base station, will have a range of around one acre, mainly limited by WIFI signal strength, while in alternative embodiments, a beacon or base station will have a range in accordance with cell signal coverage.

In further embodiments, feedback device 104 incorporates a manual shock setting, pet health monitoring, and a pet tracker. The manual shock setting may be a virtual button on the app which allows the user to push and get an instant shock for training/command purposes. The pet tracker setting will simply provide the user with the collar's whereabouts via an icon on the mapping section of the app. The mapping section of the app may integrate with other well-known internet based mapping applications, such as Google Maps °. The health monitoring of the pet may include one or more sensors, such as a heart-rate tracker, BMI (body mass index) scanner, sleep levels and, if possible, a blood-hydration tracker. One or several of the sensors may be used to build a "heat map" of the animal's movements through a structure or property. This helps an owner of the animal understand the animal's habits and where it spends its time in the structure or property.

In another embodiment, indoor location device 114 of FIG. 2 is a virtual pet-gate that allows the creation of a 3D map of boundaries within a structure such as a home. RNSS signals from satellites are typically not reliable or may not be available inside many structures. A plurality of indoor location devices 114 replace a RNSS signal inside a structure. During a set up process of feedback device 104, a floor height may be set, allowing feedback device 104 to distinguish between different floors of the structure and set unique boundaries on each floor. In another embodiment, a vertical boundary can be established either through a preset vertical room limit or by manually holding feedback device 104 at a desired height and adding a data point for the collar to track by pressing a pre-set button on the app or device 104. Once this floor height data point is established, the user may move feedback device 104 to preferred coordinates of the room and make data points at that floor height in order to create a floor map that can have its settings modified through the app. This combination of the floor height and indoor location coordinates allows height boundaries to be set in rooms so that an animal may enter a room, but not be able to reach a table-top, counter-top, etc. This can be done similarly to the floor height setting selection; the user simply placed the collar at the desired height, pushed a virtual button on the app selection menu, and selects this as the maximum height the collar can travel shock-free in the room.

Once the boundaries are set, an altimeter in feedback device 104 detects if the animal 102 has crossed a set height. Indoor location device 114 is a stationary processing unit that will communicate with feedback device 104 using a wireless communication method such as Wi-Fi, Bluetooth or cell signals to determine where, for example. where the animal 102 may or may not go within floors of the house.

Figure 3:
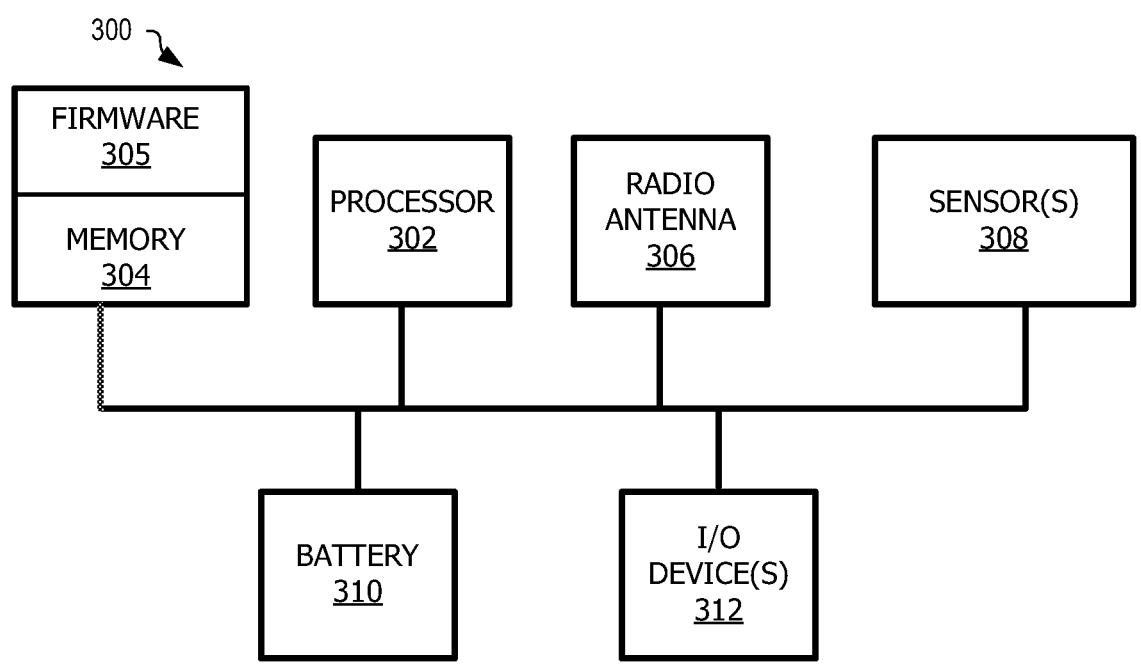
FIG. 3 shows a block diagram of a feedback device according to an exemplary embodiment of the invention.

FIG. 3 is a block diagram 300 of a feedback device 104 of FIGS. 1 and 2. A processor 302 executes instructions from firmware 305. Memory 304 also stores other data required for operation of device 104. A radio antenna 306 enables communication with satellites 106, indoor location devices 114 or a smart device, for example. Sensors 308 include, for example, an altimeter and other sensors as described above. Battery 310 may be a rechargeable battery. I/O devices 312 include one or more buttons and, optionally a display or LED light.

As will be appreciated by those skilled in the art, other changes or modifications are possible to implement the invention. Variations obvious to those skilled in the art will be included within the invention, which is defined by the following claims.

I claim:

1. An animal feedback apparatus comprising:
    a housing in which a processor, a memory, a radionavigation-satellite service (RNSS) sensor, an altimeter, a wireless communication device and a power source are at least partially disposed;
    a connector coupled to the housing, the connector configured to selectively attach to an animal;
    a feedback emitter in communication with the processor, said feedback emitter providing a feedback signal to the animal as an electric shock or an audible signal;
    wherein, the feedback emitter outputs a first feedback signal in response to a command from the processor if the RNSS sensor determines that a current position of the animal is near a set of coordinates stored in the memory; and
    wherein the feedback emitter outputs a second feedback signal in response to a command from the processor if the altimeter determines that a current position of the animal is near an elevation stored in the memory.

2. The apparatus of claim 1, wherein the connector comprises a collar configured to be removably secured around the animal's neck.

3. The apparatus of claim 1, wherein the feedback emitter comprises at least one electrical probe coupled to the connector and in contact with the animal.

4. The apparatus of claim 1, further comprising an accelerometer.

5. The apparatus of claim 1, further comprising a gyroscope.

6. The apparatus of claim 1, wherein the set of coordinates defines a geofence and further wherein geofence is defined on a remote computing device and transferred to the memory by the wireless communication device.

7. The apparatus of claim 6, wherein the remote computing device accesses and utilizes internet mapping information in defining the predefined allowed area.

8. The apparatus of claim 7, wherein the housing further comprises an input device operably coupled to the processor and the geofence is defined in cooperation with this input device.

9. A method of delivering corrective feedback to an animal, the method comprising:
    providing a housing in which a processor, a memory, a radionavigation-satellite service (RNSS) sensor, an altimeter, a wireless communication device and a power source are at least partially disposed;
    providing a connector coupled to the housing, the connector configured to selectively attach to the animal;
    providing a feedback emitter in communication with the processor, said feedback emitter providing a feedback signal to the animal as an electric shock or an audible signal;
    sensing, with the RNSS sensor that a current position of the animal is near a set of coordinates stored in the memory and outputting a feedback signal with the feedback emitter; and
    sensing, with the altimeter that a current position of the animal is above a certain elevation and outputting a feedback signal with the feedback emitter.

10. The method of claim 9, wherein the connector comprises a collar configured to be removably secured around the animal's neck.

11. The method of claim 9, wherein the feedback emitter comprises at least one electrical probe coupled to the connector and configured to be in contact with the animal when the connector is attached to the animal.

12. The method of claim 9, wherein the set of coordinates is defined by:

positioning the apparatus in a plurality of positions along a boundary of a predefined allowed area; and for each of the plurality of positions, sensing via the RNSS sensor the coordinates of such position and storing such position in the memory.

13. The method of claim 12, wherein the predefined allowed area is three dimensional.

14. An animal feedback system comprising:

a feedback device, said feedback device further comprising:

a housing in which a processor, a memory, radionavigation-satellite service (RNSS) sensor, an altimeter, a wireless communication device and a power source are at least partially disposed;

a connector coupled to the housing, the connector configured to selectively attach to an animal; and a feedback emitter in communication with the processor;

a plurality of indoor location devices further comprising a radio transmitter in communication with the wireless antenna;

wherein, the feedback emitter outputs a feedback signal comprising at least one of an electric shock or an audible signal in response to a command from the processor if the processor determines that a current position of the animal relative to the indoor location device is near a set of coordinates stored in the memory; and wherein the feedback emitter outputs a feedback signal comprising at least one of an electric shock or an audible signal in response to a command from the processor if the altimeter determines that a current position of the animal is near an elevation stored in the memory.

15. The system of claim 14, wherein the connector comprises a collar configured to be removably secured around the animal's neck and the feedback emitter comprises at least one electrical probe coupled to the connector and in contact with the animal.

16. The system of claim 14, wherein the geofence is defined on a remote computing device and transferred to the memory by the wireless communication device.

17. The system of claim 14, wherein the housing further comprises an input device operably coupled to the processor and the geofence is defined in cooperation with this input device.

* * * * *